Aug. 13, 1940.  L. E. JONES  2,210,979
SIZER
Filed Dec. 21, 1937   2 Sheets-Sheet 1
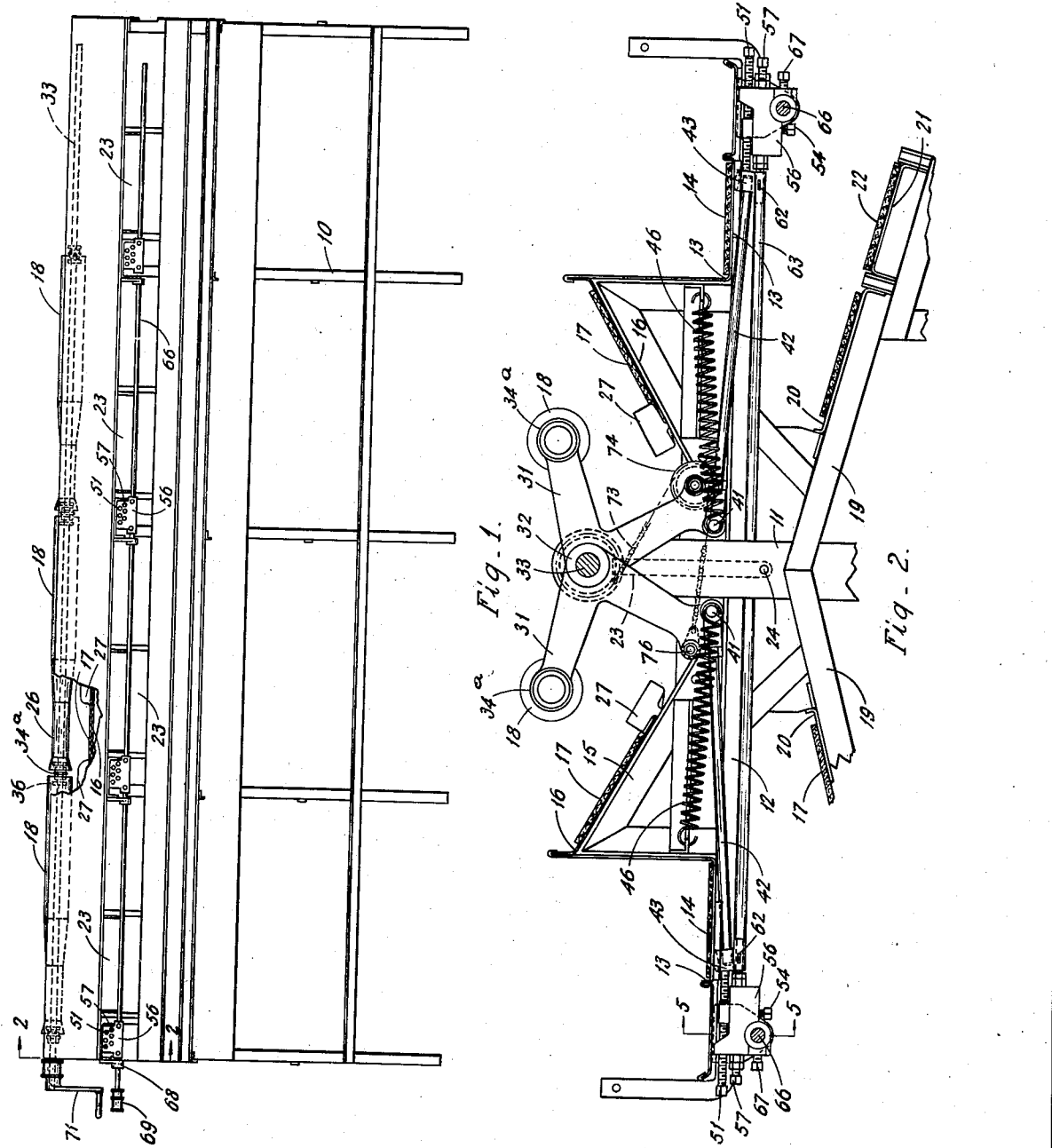
INVENTOR.
Lloyd. E. Jones.
BY Philip A. Minnis
ATTORNEY.

Aug. 13, 1940.  L. E. JONES  2,210,979
SIZER
Filed Dec. 21, 1937  2 Sheets-Sheet 2
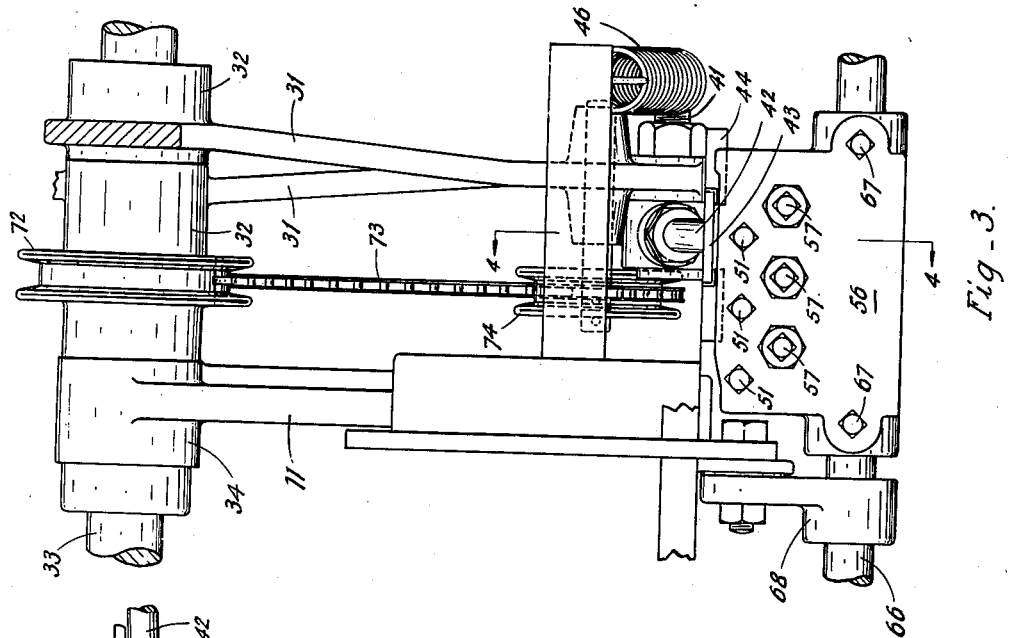
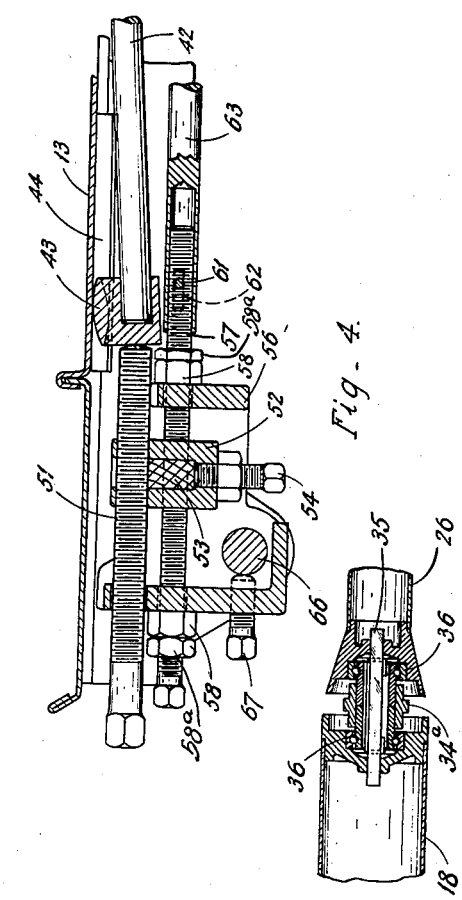
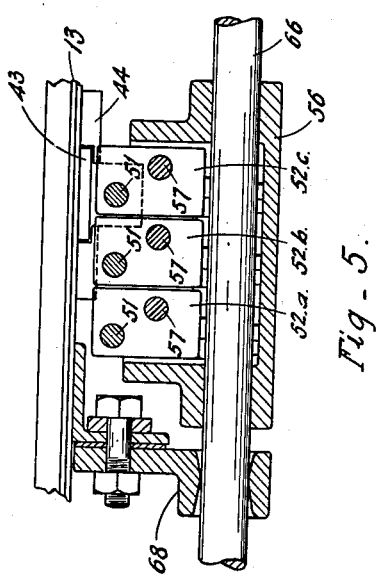
INVENTOR.
Lloyd E Jones.
BY Philip A. Minnis
ATTORNEY.

Patented Aug. 13, 1940

2,210,979

UNITED STATES PATENT OFFICE 2,210,979

SIZER

Lloyd E. Jones, Dunedin, Fla., assignor to Food Machinery Corporation, San Jose, Calif., a corporation of Delaware Application December 21, 1937, Serial No. 181,003

11 Claims. (Cl. 209—91)

This invention relates to apparatus for separating fruit and the like according to size, and is concerned more particularly with improved apparatus of this character which can be readily adjusted for use with different varieties of fruit.

With certain types of fruits, it is often desirable where the packing season overlaps, to change a sizing machine quickly to handle different varieties of fruit, as for example, grapefruit, oranges and tangerines, and it is also desirable in some instances to be able to run different kinds of fruit simultaneously through the same machine.

Heretofore, the above noted results have been either impossible to attain or else have involved a more or less laborious adjustment of the machine to change from one kind of fruit to another because the individual adjustments between sizes of the particular kind of fruit would have to be changed.

The present invention has for its general object the provision of a sizing apparatus which will overcome the disadvantageous features noted above, and provides a sizing machine which can be easily adjusted to accommodate any one of a plurality of kinds of fruit.

It is another object of the invention to provide a sizing machine of the character referred to, in which the individual adjustments for various kinds of fruit when once set into the machine do not require changing when the machine is adjusted to handle different kinds of fruit.

Other objects of the invention will be apparent from the following description of a preferred embodiment taken in connection with the accompanying drawings in which:

Fig. 1 is a side elevation of a sizing machine embodying my invention, partially broken away and with certain portions of the structure shown in dotted lines.

Fig. 2 is a fragmentary transverse section through the sizing machine taken in the plane of the line 2—2 in Fig. 1.

Fig. 3 is an enlarged view of a part of the adjusting means of the sizer.

Fig. 4 is a sectional view taken in the plane of the line 4—4 in Fig. 3.

Fig. 5 is a sectional view through a part of the machine taken in the plane of the line 5—5 in Fig. 2.

Fig. 6 is an enlarged fragmentary view illustrating the mounting of the sizing rolls.

The invention is shown as embodied in a preferred type of sizing machine in which two parallel series of sizing rolls are provided, and each series is adjustably mounted with relation to a travelling belt so that the distance of the rolls from the belt will control the diameter of the fruit which can pass therebetween to a distributing belt which carries the fruit to the proper sizing bin.

The machine includes a frame 10 having a plurality of central posts 11 (Figs. 1 and 2) from which transverse horizontal angles 12 extend outwardly to support a track 13 for the cull belt 14 and inclined framework 15 on which a track 16 for the sizing belt 17 is supported in spaced relation from sizing rolls 18 whose mounting is described later. From the posts 11, inclined angles 19 also extend outwardly to support the return track 20 for the sizing belt 17, and a track 21 for the distributing belt 22.

In order to enable flow of the fruit to either or both sides of the sizer, a longitudinal diverter gate is provided between each adjacent pair of posts 11. Referring to Figs. 1 and 2, gate 23 is pivoted at 24 in the frame so as to swing in either direction from the upright position shown to control the flow of fruit to either or both sides of the sizer.

As illustrated in Fig. 1, the sizing rolls 18 have a reduced sizing section 26 opposite which a fruit supporting rail 27 on track 16 is cut away to permit any fruit which can pass between the roll 18 and the belt 17 to fall through a suitable chute or over a suitable apron to the distributing belts 22 from which the fruit is directed into the sorting bins by suitable shunts, both of the latter not being illustrated. It will be understood that the various belts are supported by suitable drums or the like and are driven from a suitable source of power during operation of the machine.

As previously stated, the size of fruit which will drop by each sizing roll is determined by the spacing of sizing portion 26 of each roll from the adjacent belt 17 and in order to vary this spacing, the sizing rolls are mounted for vertical adjustment relative to the associated belt and to provide the adjustable mounting, a series of bell cranks 31 (Figs. 1, 2 and 3) have their hubs 32 journalled on longitudinally extending shaft 33 which is supported rotatably in bosses 34 at the top of standards 11. One bell crank 31 is provided for each roll of the two series, and at the outer end of its horizontal arm each bell crank 31 has a boss 34 (Figs. 1 and 6) which is positioned between and extends into the adjacent apertured ends of a pair of rolls 18 and carries the inner races of bearings 36 upon which the rolls are journalled. Square key 35 extends through the bearings 36 to connect adjacent rolls 18. It will be seen, therefore, that by oscillating the bell cranks 31 about the shaft 33 their vertical position with respect to the sizing belts 17 will be adjusted, and that each bell crank 31 will control the position of the adjacent ends of the roll, but that the only effective control for smaller adjustments will be with respect to the roll having its sizing portion 26 immediately adjacent the bell crank, the slight movement of the larger end of the sizing roll being ineffective insofar as adjusting the sizing portion 26 thereof.

As previously stated, each of the series of sizing rolls 18 can be adjusted for sizing tangerines, oranges or grapefruit and individual adjustments of the rolls of each series may be made to select the particular size of any variety of fruit which will pass through the sizing opening controlled thereby, and the adjustment for each particular fruit need not be changed when the adjustment of the rolls is changed from one variety of fruit to another. To control the adjusted position of the bell cranks 31, the lower end of each bell crank is connected by a pin 41 with outwardly extending adjusting rod 42 (Fig. 2) which carries at its outer end a T-shaped guide 43 (Figs. 2 to 5) which has its flanges slidably received in a pair of opposed grooved track members 44 secured beneath cull belt track 13. The respective rods 42 of an associated pair of bell cranks 31 are urged outwardly by springs 46 tensioned between pins 41 and the frame so that the guide 43 is urged against the end of an adjusting screw 51 (Fig. 4) threaded in a block 52 and locked in adjusted position relative thereto by a wooden pin 53 having a set screw 54 associated therewith.

Three adjusting blocks 52 are provided for each adjusting rod 42 and are slidably mounted in side by side relation within a block carrier 56, the laterally adjusted position of each adjusting block 52 within the block carrier being controlled by an associated master adjusting screw 57 threaded therein and extending freely through the block carrier 56. Nuts 58 are threaded on the ends of screw 57 for engagement with the walls of the block carrier to position screw 57 with respect thereto, jam nuts 58a being provided to lock the nuts 58 on the screw 57. The inner end of each screw 57 carries a transversely extending pin 61 which is slidably received in opposed slots 62 of a connecting rod 63 which extends between and has its ends recessed to receive the similar master adjusting screws 57 for the opposed rolls of the two series, the adjusting screws 57 on one side of the machine being threaded oppositely to those on the other side thereof so that unidirectional rotation of each associated pair of screws 57 will cause both blocks 52 mounted on said screws on opposite sides of the machine to move inwardly or outwardly, as the case may be, together. As seen in Fig. 5, the three adjusting blocks 52a, 52b, and 52c provided within the block carrier 56 are each associated with a sizing screw 51 and a master adjusting screw 57, the three adjusting blocks being provided for the adjustment of the rolls for use with tangerines, oranges and grapefruit respectively.

Each block carrier 56 of a series is secured on a longitudinally extending shaft 66 by means of set screws 67 (Figs 3 and 4), the shaft 66 being slidably supported by suitable apertured brackets 68 depending from the frame. As seen in Fig. 5, the adjusting block 52c is aligned with the associated guide 43 so that its adjusting screw 51 provides an adjustable stop for the associated rod 42 and the bell crank 21 associated therewith to control the position of the associated sizing roll 18 with respect to its sizing belt.

It will be seen also that by longitudinal adjustment of the shaft 66, the block carrier 56 can be moved to align either of adjusting blocks 52a or 52b with the guide 43 instead of the block 52c, and this adjustment may be effected from the feed end of the machine where a handle 69 is provided on the shaft 66 as shown in Fig. 1.

In order to enable free adjustment of the adjusting blocks and their carriers, means are provided for moving the guides 43 out of engagement with the associated adjusting screws before a change in the adjustment is made. For this purpose, the shaft 33 (Fig. 1) is provided with a handle 71 by means of which it can be rotated, and adjacent each pair of bell cranks 31 the shaft 33 carries a grooved roller 72 to which an end of a chain 73 is secured. Each chain 73 (Fig. 2) extends about an idler wheel 74 journalled on the lower arm of one bell crank 31 of a pair and has its other end secured at 76 to the other bell crank 31. By rotating shaft 33 in clockwise direction as viewed in Fig. 2, the entire group of bell cranks 31 will be oscillated to move their lower arms together and thereby withdraw the rods 42 and their guides 43 from engagement with the associated adjusting screw, so that the block carriers can be shifted longitudinally without interference to move another set of adjusting screws into alignment with the guides 43. When this is effected the bell cranks 31 are moved to their new adjustment by return of the shaft 33 to the position shown in Figs. 1 and 2, and the action of the springs 46 to move the rods 42 outwardly into engagement with the newly positioned adjusting screws, and to change the variety of fruit being sized.

From the above description, it will be apparent that the sizing machine of my invention can be adjusted easily to handle different varieties of fruit, and that the individual roll adjustment of the sizes for each variety of fruit do not require any alteration when the change from one variety to another is made. Also, when desired, one series of sizing rolls can be used with one variety of fruit while the other series is adjusted to handle a different variety.

While I have shown and described a preferred embodiment of the invention, it will be apparent that the invention is capable of both variation and modification from the particular form illustrated without departing from the scole thereof, which should be limited only by the scope of the claims appended hereto.

I claim:

1. In a fruit sizer, a sizing roll, a conveyor associated with said sizing roll to form a sizing opening therewith, means mounting said roll for movement to vary the width of said sizing opening, means biasing said roll toward movement in one direction, a series of stops for selective association with said roll to limit said movement, a support for each of said stops having an adjustable connection therewith, common means mounting said supports for individual adjustment relative thereto, means for disabling said biasing means and disabling the active stop relative to said roll, and means for selectively enabling said stops.

2. In a fruit sizer, a series of sizing rolls, a conveyor associated with said sizing rolls to form a series of sizing openings therewith, means mounting each of said rolls for movement to vary the width of its sizing opening, means biasing each of said rolls toward movement in one direction, a series of stops for selective association with each of said rolls to limit said movement, a support for each of said stops having an adjutable connection therewith, common means mounting said supports of each series for individual adjustment relative thereto, means for disabling said biasing means and disabling the active stops relative to said rolls, and means for selectively enabling similar stops of each series.

3. In a fruit sizer, a conveyor, a roll having a sizing portion disposed in cooperative relation with said conveyor, a lever to support said roll, a spring operative on said lever to move said roll away from said conveyor, means to limit said movement of said roll including a stop screw, a member into which said screw is threaded, and a master screw to position said member in adjusted position.

4. In a machine for sizing different varieties of fruit, the combination of: wall means forming a pair of substantially parallel fruit sizing runways, one wall of each of said runways being movable toward and away from the other wall of said runway to vary the width of the latter; means providing a plurality of adjustable settings for each of said movable walls, there being one of said settings for each of a plurality of varieties of fruit to be sized by said machine; means for bringing each of said movable walls into operative relation with a selected one of said adjustable settings to set the width of said runways for sizing any given one of said varieties of fruit; and unitary means for altering a selected one of the aforesaid adjustable settings of one of said movable walls and simultaneously therewith causing a similar alteration in the corresponding adjustable setting for the other of said movable walls.

5. In a machine for sizing different varieties of fruit, the combination of: wall means forming a pair of substantially parallel fruit sizing runways, one wall of each of said runways comprising a plurality of end-to-end sections, each of said sections being movable toward and away from the other wall of said runway; means providing adjustable settings for said movable wall sections, there being one of said settings for each of said sections for each of a plurality of varieties of fruit to be sized by said machine; means for bringing each of said movable wall sections into operative relation with a selected one of the aforesaid adjustable settings for that wall section to set the width of said runway adjacent said section for sizing any given one of said varieties of fruit; and unitary means for altering a selected one of the aforesaid adjustable settings of a selected one of said wall sections and simultaneously therewith causing a similar alteration in the corresponding adjustable setting of the opposite wall section of the other of said runways.

6. A combination as in claim 5, in which unitary control means is provided for bringing all of the said wall sections of one of said runways into operative relation with a selected series of said adjustable settings to set the width of said runway throughout the length thereof for sizing a given one of said varieties of fruit.

7. In a machine for sizing different varieties of fruit, the combination of: means forming a pair of parallel fruit sizing runways, each of the latter being adjustable in width; a group of blocks associated with each of said runways, each of said blocks being mounted for movement transversely of said runways; an adjustable stop on each of said blocks; a control means for each of said runways, each control means being operatively related to the stop of a selected one of the blocks associated with said runway for setting the width of said runway to prepare said runway for sizing a given one of said varieties of fruit; and unitary means for altering the position of any block of one of said groups and simultaneously therewith causing a similar alteration in the position of the corresponding block of the other of said groups.

8. A combination as in claim 7, in which means is provided for mounting each of said groups of blocks for movement longitudinally relative to said runways to enable bringing the stop of a selected one of said blocks into operative relation with said control means.

9. In a machine for sizing different varieties of fruit, the combination of: a pair of fruit sizing runways each comprising a conveyor and a roller with the latter movable toward and away from the conveyor; a group of individually adjustable stops associated with each of said runways; a plurality of control means, each of which is operatively related to a selected stop of one of said groups of stops for setting one of said rollers in relation to one of said conveyors for sizing a given one of said varieties of fruit; and a plurality of unitary means, one of which is provided for altering the position of each of said stops of one of said groups and simultaneously therewith causing a similar alteration in the position of the corresponding stop of the other of said groups.

10. In a machine for sizing different varieties of fruit, the combination of: a frame for said machine; walls forming a fruit sizing runway, one wall of said runway comprising a plurality of end-to-end sections, each of said sections being movable toward and away from the other wall of said runway; means disposed laterally from said runway and mounted on said frame along an outer side edge of said machine, and providing adjustable settings for said movable wall sections, there being a group of said settings for each of a plurality of varieties of fruit to be sized by said machine, and a setting in each of said groups for each of said sections; means connected with the respective movable sections of said runway for spacing said sections from the other wall of said runway, said spacing means being adapted to contact one or the other of said groups of settings to set the aforesaid sections for sizing a selected one of said varieties of fruit; means for separating and then bringing together said spacing means and said adjustable setting means; and means selectively operable during said separation for causing relative movement between said adjustable setting means and said spacing means to cause said spacing means to be disposed opposite any desired one of the aforesaid groups of said settings so that when said means are brought together again, said particular group of settings will co-operate with said spacing means to set the width of said runway opposite the respective movable wall sections for sizing a predetermined one of said varieties of fruit.

11. In a machine for sizing different varieties of fruit, the combination of: a frame for said machine; walls forming a fruit sizing runway, one wall of said runway comprising a plurality of end-to-end sections, each of said sections being movable toward and away from the other wall of said runway; means disposed laterally from said runway and mounted on said frame along an outer side edge of said machine, and providing adjustable settings for said movable wall sections, there being a group of said settings for each of a plurality of varieties of fruit to be sized by said machine, and a setting in each of said groups for each of said sections; means connected with the respective movable sections of said runway for spacing said sections from the other wall of said runway, said spacing means being adapted to contact one or the other of said groups of settings to set the aforesaid sections for sizing a selected one of said varieties of fruit; means for separating and then bringing together said spacing means and said adjustable setting means; and means selectively operable during said separation for moving said adjustable setting means to cause said spacing means to be disposed opposite any desired one of the aforesaid groups of said settings so that when said means are brought together again, said particular group of settings will co-operate with said spacing means to set the width of said runway opposite the respective movable wall sections for sizing a predetermined one of said varieties of fruit.

LLOYD E. JONES.